(12) United States Patent
Couaillet et al.

(10) Patent No.: US 8,300,649 B2
(45) Date of Patent: Oct. 30, 2012

(54) MOBILITY MANAGEMENT METHOD FOR MOBILE TERMINALS IN A CELLULAR WIRELESS COMMUNICATION SYSTEM, AND EQUIPMENT FOR IMPLEMENTING THE METHOD

(75) Inventors: Bertrand Couaillet, Maurepas (FR); Phillippe Duplessis, Colombes (FR); Catherine Duplessis, legal representative, Colombes (FR); Isabelle Duplessis, legal representative, Colombes (FR); Mauricette Duplessis, legal representative, Colombes (FR)

(73) Assignee: Alcatel Lucent, Paris (FR)

( * ) Notice: Subject to any disclaimer, the term of this patent is extended or adjusted under 35 U.S.C. 154(b) by 341 days.

(21) Appl. No.: 12/302,282

(22) PCT Filed: May 22, 2007

(86) PCT No.: PCT/EP2007/004507
§ 371 (c)(1),
(2), (4) Date: Oct. 4, 2010

(87) PCT Pub. No.: WO2007/134830
PCT Pub. Date: Nov. 29, 2007

(65) Prior Publication Data
US 2011/0222514 A1    Sep. 15, 2011

(30) Foreign Application Priority Data

May 24, 2006   (EP) .................................... 06290857

(51) Int. Cl.
*H04L 12/28* (2006.01)
(52) U.S. Cl. ......... 370/401; 370/352; 370/328; 370/338
(58) Field of Classification Search .................. None
See application file for complete search history.

(56) References Cited

U.S. PATENT DOCUMENTS

| | | | | |
|---|---|---|---|---|
| 6,275,706 B1 * | 8/2001 | Rune | ........................... | 455/456.1 |
| 6,397,065 B1 * | 5/2002 | Huusko et al. | ............. | 455/435.2 |
| 2003/0040314 A1 * | 2/2003 | Hogan et al. | ................... | 455/435 |
| 2004/0185884 A1 * | 9/2004 | Marin et al. | ................... | 455/466 |
| 2006/0229057 A1 * | 10/2006 | Farrugia et al. | ............... | 455/403 |
| 2008/0311927 A1 * | 12/2008 | Boman et al. | ............... | 455/456.1 |

FOREIGN PATENT DOCUMENTS

| | | |
|---|---|---|
| EP | 1351530 A1 | 10/2003 |
| EP | 1519613 A2 | 3/2005 |
| WO | 9750274 A1 | 12/1997 |
| WO | 2005060292 A1 | 6/2005 |

* cited by examiner

*Primary Examiner* — Duc C Ho
(74) *Attorney, Agent, or Firm* — Fay Sharpe LLP (57) ABSTRACT

The present invention relates to a mobility management method for mobile terminals in a cellular wireless communication system. The system comprises a core network and an access network comprising at least one controller, each controller controlling a group of base stations each defining at least one cell, and sets of cells form respective location areas. In the method the cells defined by the base stations controlled by each controller of the access network form a predetermined number of location areas and the belonging of each of the cells to one of the predetermined number of location areas is independent of its geographical location.

20 Claims, 6 Drawing Sheets

MOBILITY MANAGEMENT METHOD FOR MOBILE TERMINALS IN A CELLULAR WIRELESS COMMUNICATION SYSTEM, AND EQUIPMENT FOR IMPLEMENTING THE METHOD

The present invention relates to mobility management in cellular wireless communication systems, in particular, but not exclusively in the context of deployment of home gateways (HGWs) for cellular radio networks. More specifically the invention relates to location area management and/or paging procedures in cellular communication systems.

It has been proposed (see e.g. U.S. Pat. No. 6,615,035) to provide customers of cellular operators with so-called home base stations (HBSs). Such a unit is to be connected to the customer's telephone land line and it presents a radio interface similar to that of the cellular infrastructure. When the customer uses his/her handset at home, namely within range of the HBS, the call is established via the land line and the public switched telephone network (PSTN) instead of the cellular network. Mobility functions between the coverage of the HBS and the cells of the cellular infrastructure are not offered.

The deployment of home base stations poses a number of problems, in particular for radio engineering and access control. The HBSs have not been designed for extending the coverage of the cellular infrastructure, but rather as a convenience for the customer to use his/her handset at home while paying the communications at the PSTN tariff.

The concept of HBS has the potential of providing indoor coverage, which is always a challenge from the cellular operator point of view. This advantage also exists with the concept of home gateway. A HGW also provides a radio interface similar to that of the cellular infrastructure, but it interfaces with the cellular network rather than with the PSTN. The coverage of the HGW can be considered as a cell of the network, to which it is fully integrated.

In cellular communication networks, base transceiver stations (BTSs) are controlled by base station controllers (BSCs), also referred to as radio network controllers (RNCs) in certain systems. Each BTS forms at least one radio network cell, which is defined by its coverage area. Each cell is identified by a unique cell identity (cell ID).

Radio network cells that are geographically located close to each other form a location area (LA), which is associated with a respective location area code (LAC). In cellular radio network systems, one RNC generally controls cells that are part of the same location area.

In some cases, such as in the context of HGWs, the number of base stations can be very high under the control of a given RNC. For instance in third generation (3G) UMTS ("Universal Mobile Telecommunications Service") networks, the maximum number of cell IDs that can be allocated to a single RNC is 65535. In this case every paging message should be sent to at least 65535 cells, but this would load the network far too much. During busy hours, it may be assumed that the mobile stations (MSs) receive an average about one incoming call an hour. This would mean that approximately 18 paging messages in a second should be sent to all 65535 cells (i.e. over 1,000,000 messages in total).

A further issue is the engineering complexity in defining the LAs, i.e. associating LACs to cells. The problem is especially relevant for cells covered by HGWs, because the operator may not know where each HGW is geographically located in the communication network. This can be a very complicated task especially if the number of HGWs is very large. Furthermore, end users would not be able to move their HGWs to another location without informing the operator of the new location of the HGW.

An object of the invention is to limit the above identified deficiencies. More specifically location area management and paging procedures need to be improved in cellular communication networks.

According to a first aspect of the invention, there is proposed a mobility management method in a cellular wireless communication system comprising a core network and an access network comprising at least one controller, each controller controlling a group of base stations each defining at least one cell, wherein sets of cells are set to form respective location areas, the method being characterised in that the cells defined by the base stations controlled by each controller of the access network form a predetermined number of location areas and in that the belonging of each of the cells to one of the predetermined number of location areas is independent of its geographical location.

The invention in accordance with the first aspect has the advantage that the mobility management becomes simpler, since now the determination of LAs is independent of the geographical location of some cells. Thus, the network operator does not have to know where each base station is physically located in the network. Therefore, network engineering is simplified and this leads to cost reductions. Also network maintenance costs are lower when the proposed solution is employed, because network elements are less involved in mobility management.

Furthermore, in accordance with an embodiment of the invention which can be independent of the one referred to in the above paragraph, subscribers are capable of communicating with the system by use of mobile terminals and the system further comprises a register in which the identities of the latest cells in which the mobile terminals are located are saved in association with the subscriber identities corresponding to said mobile terminals. The core network sends a paging message containing a subscriber identity to the controller serving the cell which the terminal to be paged is communicating with, the controller checks the register for the corresponding subscriber identity and the latest identity of the cell which the terminal is communicating with and the controller sends the paging message only to the cell which the terminal is communicating with.

A further advantage is that the probability of successful paging procedure increases since the paging messages are more likely to get through to the correct recipient, since there is less signalling in the network compared to a situation in which the controller sends the paging message to all cells it is controlling.

According to a second aspect of the invention, there is proposed a computer program product for implementing the method in accordance with the first aspect of the invention, when the program is loaded and run on computer means of the system.

According to a third aspect of the invention, there is proposed a cellular wireless communication system comprising a core network and an access network comprising at least one controller, each controller being arranged for controlling a group of base stations each defining at least one cell, wherein sets of cells form respective location areas, the system being characterised in that the cells defined by at least some of the base stations controlled by a controller of the access network form a predetermined number of location areas and in that the belonging of each of said cells to one of the predetermined number of location areas is independent of its geographical location.

According to a fourth aspect of the invention, there is proposed a base station in a cellular wireless communication system, the system comprising a core network and an access network comprising at least one controller, each controller is arranged for controlling a group of base stations each defining at least one cell, wherein sets of cells form respective location areas, the base station being characterised in that the base stations are arranged for defining a cell which forms at least part of a location area among a predetermined number of location areas and the belonging of said cell to said location area being independent of its geographical location.

Other features and advantages of the invention will become apparent from the following description of non-limiting exemplary embodiments, with reference to the appended drawings, in which.

The invention will now be described in more detail in connection with a HGW third generation UMTS cellular radio network, but it is appreciated that the invention can also be applied to other networks, such as a GSM network.

General Network Architecture

Figure 1:
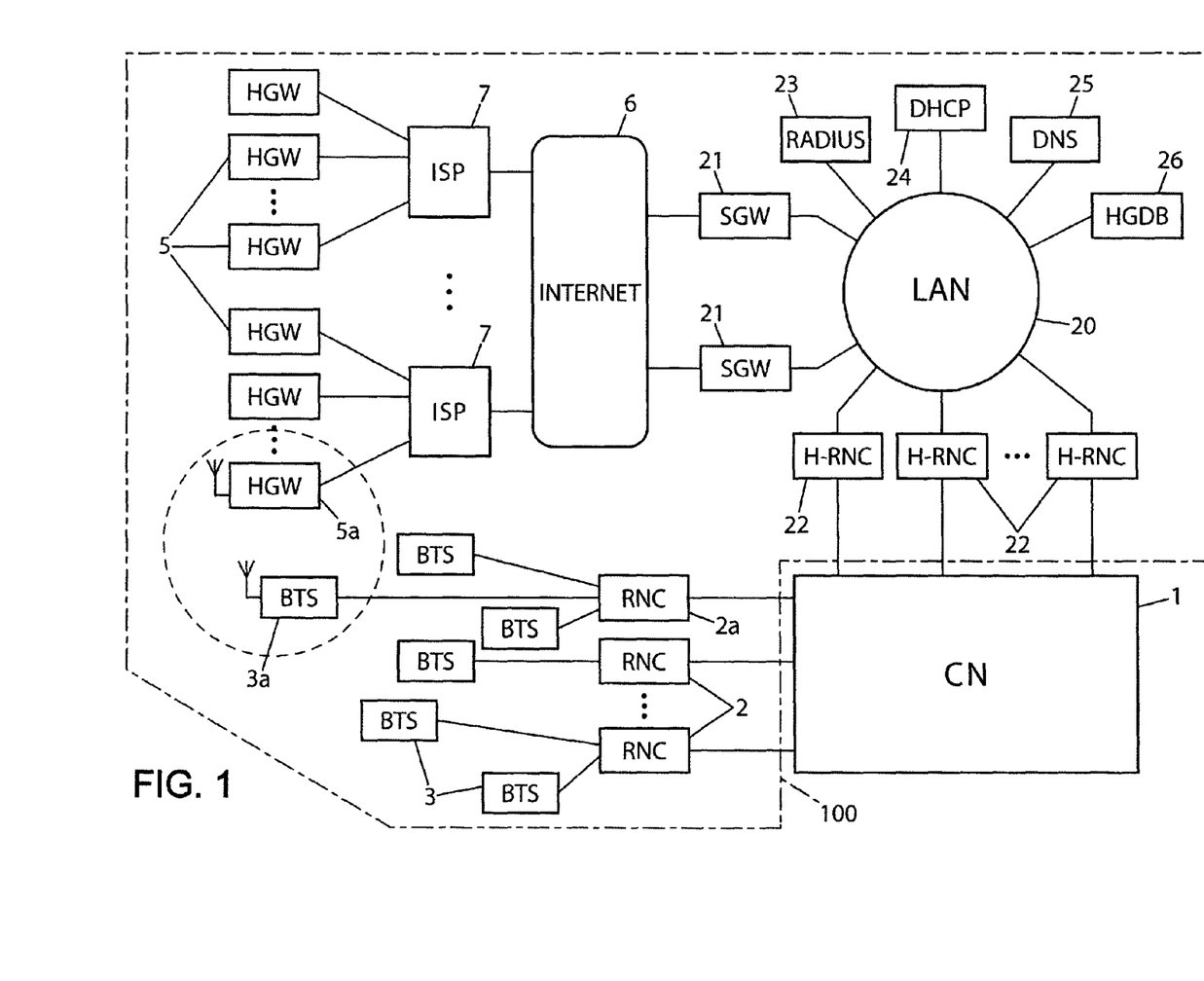
FIG. 1 is a block diagram of a cellular wireless communication system illustrating an environment in which the embodiments of the invention may be applied.

Referring to FIG. 1, a conventional UMTS system includes a core network (CN) 1 comprising interconnected switches referred to as MSC/VLR (mobile switching center/visitor location register) for circuit-switched services and as SGSN (serving GPRS support node) for packet-switched services. In the UMTS terrestrial radio access network (UTRAN) architecture, a number of RNCs 2 are connected to the CN switches. Each RNC 2 supervises a number of BTSs 3, or nodes B, through an interface referred to as Iub in the UMTS standards. The BTSs are distributed over the territory to be covered by the access network 100. Each BTS 3 serves one or several cells where the cellular service is made available to the public.

In FIG. 1, HGWs 5 are added to the access network 100 to define cells of a different kind. A HGW 5 uses the same radio interface as a regular BTS 3. For convenience, the set of HGWs 5 can be allocated a specific carrier frequency distinct from that or those used by the BTSs 3 of the so-called "macro-layer", so as to avoid complications in the radio engineering of the public part of the access network due to interference with HGWs 5. The radio range of a HGW 5 is low, typically a few tens of meters. It is intended to be installed in customer premises, so that it is an efficient means for the cellular operator to offer indoor coverage.

A HGW 5 uses the customer's digital subscriber line (DSL) for broadband access to the Internet 6, for example an asymmetric digital subscriber line (ADSL). The customer's DSL connects the HGW 5 to a router 7 of his/her Internet service provider (ISP).

A private operator network organised as a local area network (LAN) 20 is provided for the integration of the HGWs 5 to the cellular access network 100. The units of the private operator network 20 include:

security gateways (SGW) 21 connected to the Internet 6 and capable of establishing secure tunnels with the HGWs 5 through the Internet 7;

a plurality of RNCs 22, designated here as H-RNC, each connected to the core network 1;

an authentication server 23, typically using the RADIUS protocol;

a DHCP server 24 for providing the HGWs 5 with IP addresses in accordance with the standard dynamic host configuration protocol (DHCP);

a domain name server (DNS) 25; and a home gateway management server 26, or home gateway database (HGDB).

In an exemplary solution (FIG. 2), the HGW 5 belongs to a set top box 10, either as a built-in unit or as a peripheral unit, along with other modules such as an Ethernet board 11, a Wifi board 12, a TV decoder 13, etc. A network address translator (NAT) module 14 is provided within the set top box 10 for interfacing with the Internet via the subscriber's access line 16 and separating the public addressing domain from the private addressing domain of the customer.

Figure 2:
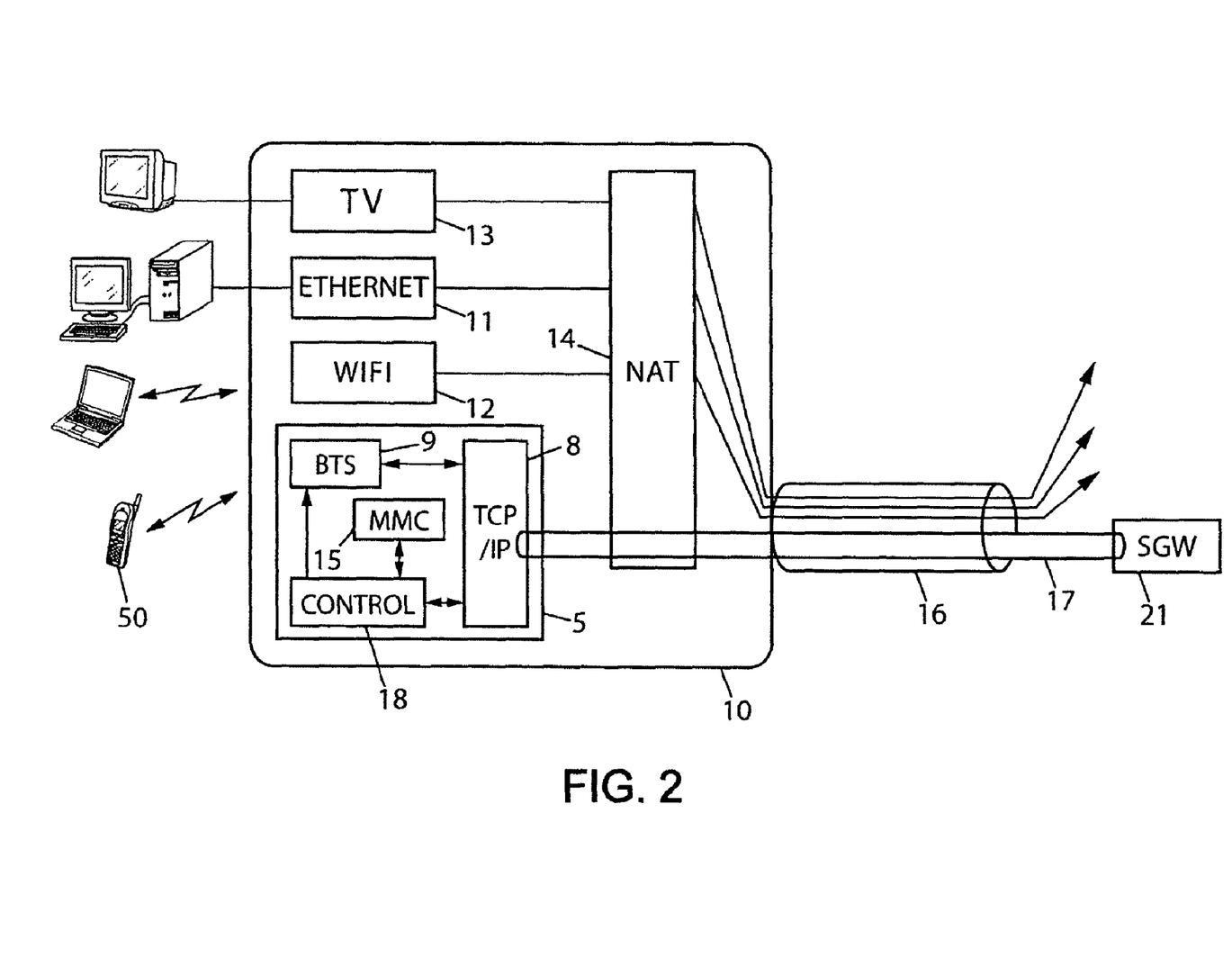
FIG. 2 is a block diagram of customer equipment including a home gateway.

The HGW 5 has a network (TCP/IP) interface 8 and a BTS unit 9 suitable for performing the node B functions of the UMTS standard. The HGW 5 is also fitted with a memory microcard (MMC) module 15 in which certain parameters are stored, including:

a HGW identifier (ID) accessible for reading only, which may be coded in the same manner as the international mobile subscriber identity (IMSI);

the IP address of a main SGW 21 to be contacted by the HGW. A backup SGW IP address may also be provided in case the main SGW would not be available;

the IP address of a HGDB 26 to be contacted by the HGW; and security credentials for the HGW, stored internally of the MMC without any possible access from the outside.

A control module 18 of the HGW 5 supervises the operation of the BTS unit 9 and exchanges information with the MMC module 15 and the private operator network 20.

Before the HGW 5 is delivered to the customer, some pre-configuration is needed to create the HGW ID and the associated security credentials, to record them into the RADIUS server 23, and to load the above-listed parameters into the MMC module 15. In addition, any customer-specific parameters needed for the operation of the HGW ID are defined and stored in the HGDB 26.

The HGW 5 is designed to be plug-and-play. When the customer plugs in and activates his HGW 5, its control module 18 automatically contacts the SGW 21 at the IP address written in the MMC module 15. This initiates the Internet access phase 30 indicated in FIG. 3. In connection with the RADIUS server 23, the SGW 21 proceeds with the authentication of the HGW 5 and the establishment of an IPsec tunnel 17 with the HGW 5. This secure tunnel 17 will be used to encapsulate the UMTS Iub interface between the BTS unit 9 of the HGW 5 and a H-RNC 22 over the Internet 6. The use of a secure tunnel prevents unauthorised HGWs from getting service from the CN 1 and avoids various potential security threats.

Figure 3:
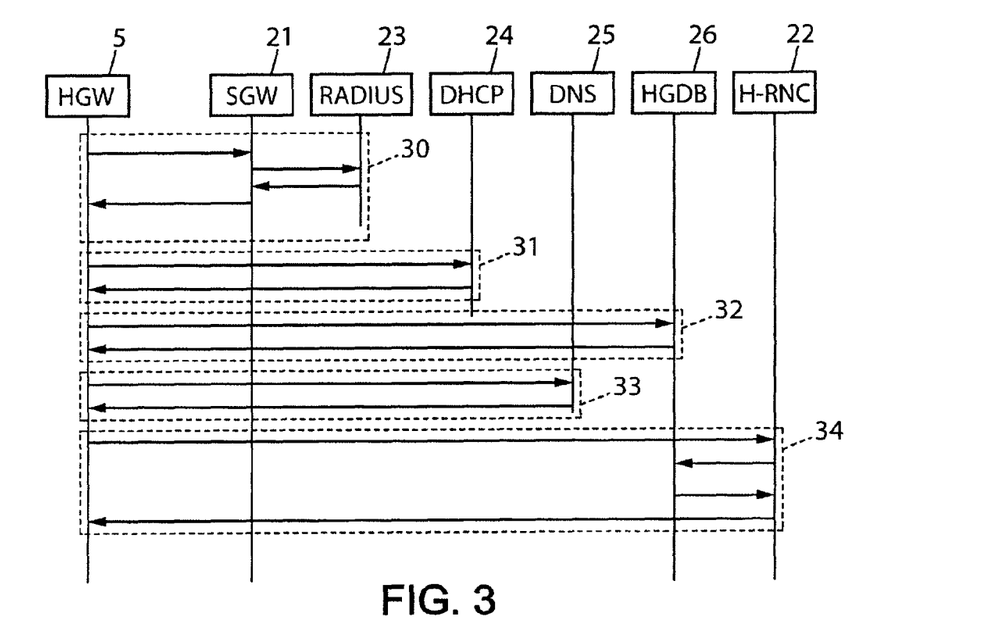
FIG. 3 is a diagram illustrating different phases of the configuration of a home gateway.

The next phase 31 of the configuration is the assignment of an IP address to the HGW 5 by means of a request sent by the control module 18 of the HGW 5 to the DHCP server 24. Then, in phase 32, the control module 18 of the HGW 5 contacts the HGDB 26 whose address is stored in the MMC module 15, and retrieves from this HGDB 26 all the customer-specific parameters including the domain name of a H-RNC 22 allocated to this HGW 5. In phase 33, the IP address of the H-RNC is resolved by an exchange between the control module 18 of the HGW and the DNS 25. The HGW 5 can then proceed with the attachment 34 of its BTS unit 9 with the allocated H-RNC 22.

In the attachment phase 34, the HGW 5 sends an attachment request to its H-RNC 22. The H-RNC 22 retrieves from the HGDB 26 all the parameters provisioned for this HGW 5 and confirms the attachment to the HGW 5. The BTS unit 9 is then capable of supporting communications for one or more MSs (UE) 50 located within its range.

The attachment phase 34 is repeated each time the HGW 5 is switched on. The parameters which are returned by the HGDB 26 upon the H-RNCs 22 request include the identity of the H-RNC 22 currently allocated to the HGW 5. It can happen that the allocation changes over time, and in this case, the H-RNC 22 contacted by the control module 18 and receiving the ID of another H-RNC 22 from the HGDB 26 notes the inconsistency and returns to the HGW 5 a message to cause the HGW 5 to resume its configuration procedure from the start. This will establish the new link between the HGW 5 and its new serving H-RNC 22. The previous H-RNC 22 then removes the HGW 5 from its list of supervised BTSs.

Optionally, certain post-configuration steps can be executed once the actual owner of the HGW 5 is known, in order to add information to the previously stored customer-specific parameters, such as the geographical coordinates of the installed HGW 5, for emergency services, or some mobility information usable in certain advantageous embodiments.

Location Area Management

Next location area management will be dealt in connection with location area codes (LACs) for the circuit switched (CS) domain. It is to be noted that the following also applies to routing area codes (RAC) which have a similar meaning for the packet switched (PS) domain. Thus, in the present description, when speaking of location areas, it should be understood that this includes location areas in the CS domain and routing areas used for the PS domain. Furthermore, in the following description the HGWs 5 serve as base stations and each of them define one cell. But the cells could equally be of other types as well, such as micro, pico or macro cells and there could also be more than one cell per BTS.

Figure 4:
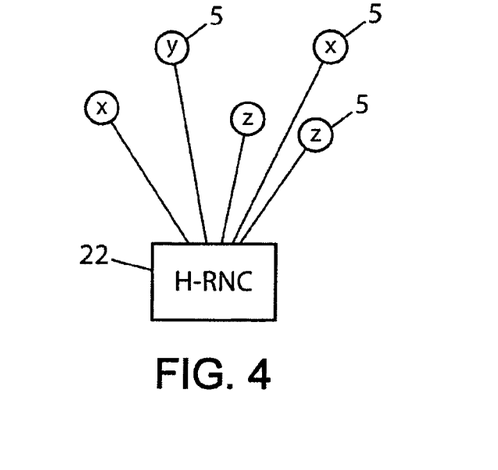
FIG. 4 is a schematic illustration of a single cell layer solution in accordance with an embodiment of the invention.

FIG. 4 depicts a solution provided in accordance with an embodiment of the invention. In FIG. 4 it can be seen that an H-RNC 22 controls plurality of HGWs 5, in this case five different HGWs 5. In FIG. 4, there are two HGWs 5 associated by a LAC x, two HGWs 5 associated by a LAC z and one HGW 5 associated by a LAC y. In reality one H-RNC 22 would probably control many more HGWs 5, but for simplicity, only five HGWs 5 are shown in this example.

Figure 9:
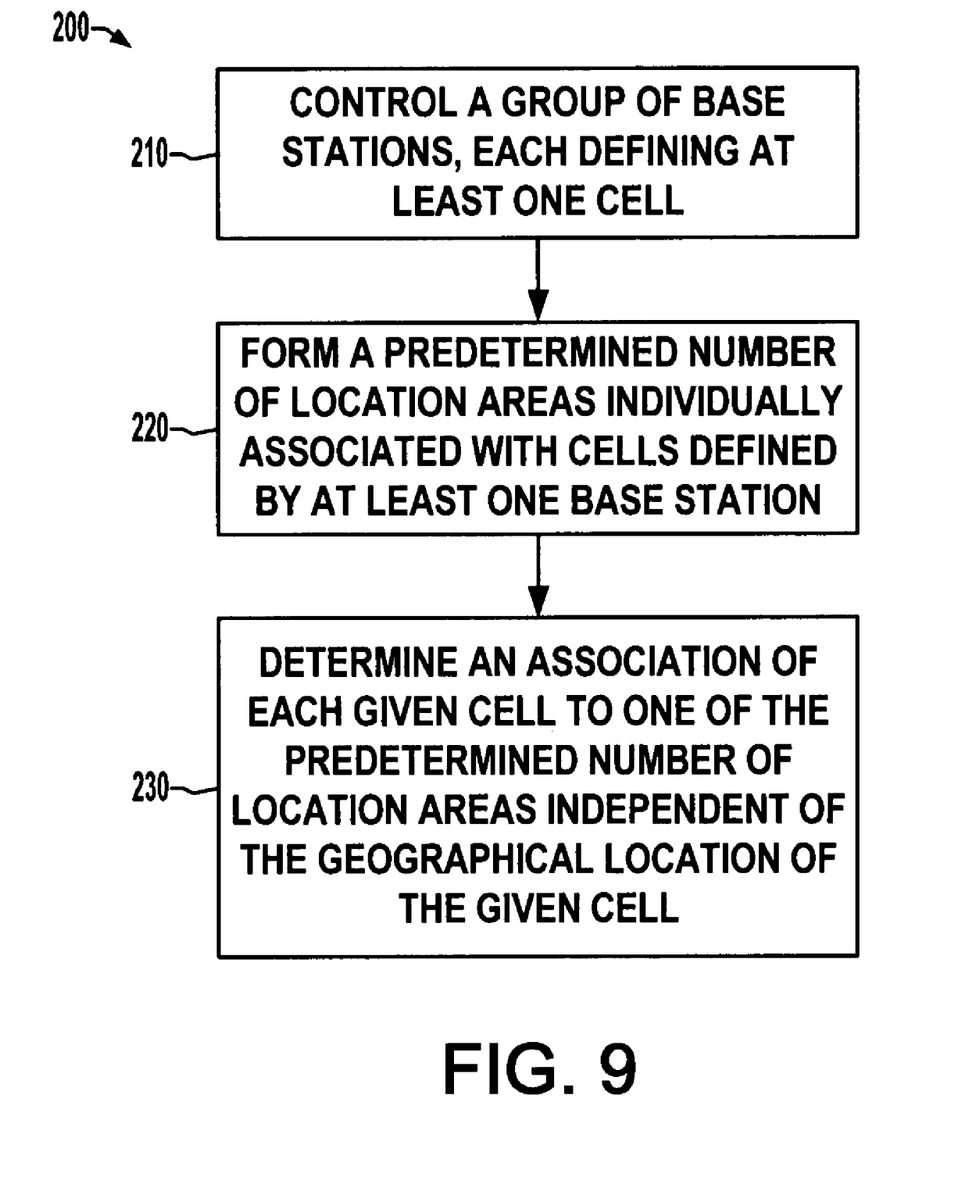
FIG. 9 illustrates an exemplary method according to an embodiment of the invention.

FIG. 9 illustrates an exemplary mobility management method 200 is illustrated, in which a group of base stations is controlled at 210, each of which defining at least one cell. At 220, a predetermined number of location areas is formed, individually associated with cells defined by at least one base station. At 230, an association of each given cell to one of the predetermined number of location areas is determined independent of the geographical location of the given cell. Furthermore, now the different LACs are allocated to HGWs 5 independently of the geographical location of the HGWs 5 or of the cells they define. The different LACs may even be allocated to HGWs 5 randomly.

According to an embodiment of the invention, an HGW radio communication system can be arranged so that an H-RNC 22 controls a predetermined number of LAs. The LAs may be formed by using as least significant bits of the LAC the m least significant bits of the corresponding cell identity and as most significant bits the corresponding controller identity, where 2m equals to said predetermined number. In this example the predetermined number equals to 32 and each LA contains at most 2048 HGWs 5 (65536 divided by 32). In this case the LAC is built by using as least significant bits (LSBs) the m=5 LSBs of the HGW 5 identities complemented by the identity of the H-RNC 22 for the most significant bits (MSBs).

The fact that there is no geographical continuity among HGWs 5 associated by a given LA is not a problem since MSs 50 move very little between different HGWs 5, because HGWs 5 may be designed mainly to provide indoor coverage, for instance in the range of 5 to 20 meters. Having 32 location areas allocated to each H-RNC 22 is a good compromise so that in case the HGWs 5 have an umbrella cell, such as a macro cell, the macro layer VLR when receiving a location area update request will find the route towards the HGW VLR and the standard location updating request will apply. It should be understood that an H-RNC 22 could equally control any other number of HGWs 5.

Figure 5:
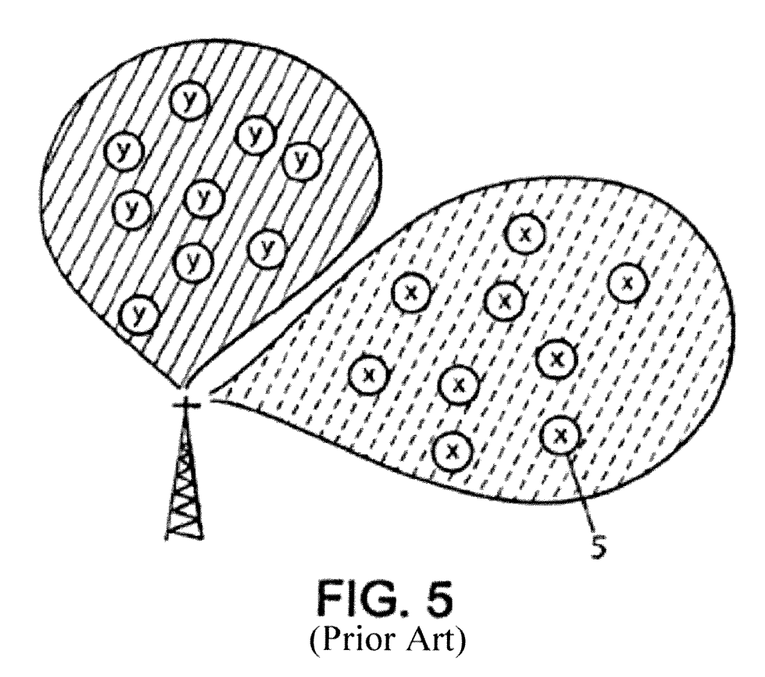
FIG. 5 is a schematic illustration of an umbrella cell and HGWs within the umbrella cell in accordance with a prior art solution.

In a multi layer environment, the upper cell layer (e.g. macro) location areas (LAs) managed by RNCs 2 may contain several lower cell layer (e.g. HGW) LAs. Lower cell layer cells associated by a certain LAC can be geographically dispersed so that geographical continuity no longer exists between the cells associated by the same LAC. In other words the HGWs 5 associated by a certain LAC are not confined to an area containing only HGWs 5 associated by the same LAC. To illustrate the situation, FIG. 5 describes a prior art solution. From FIG. 5 it can be seen that the HGWs are inside a coverage area of two macro cells, the dashed area depicting the coverage area of the macro cell having a LAC x and the macro cell identified by solid lines has a LAC y. In this case the HGWs 5 have the same LACs as the corresponding umbrella macro cells.

Figure 6:
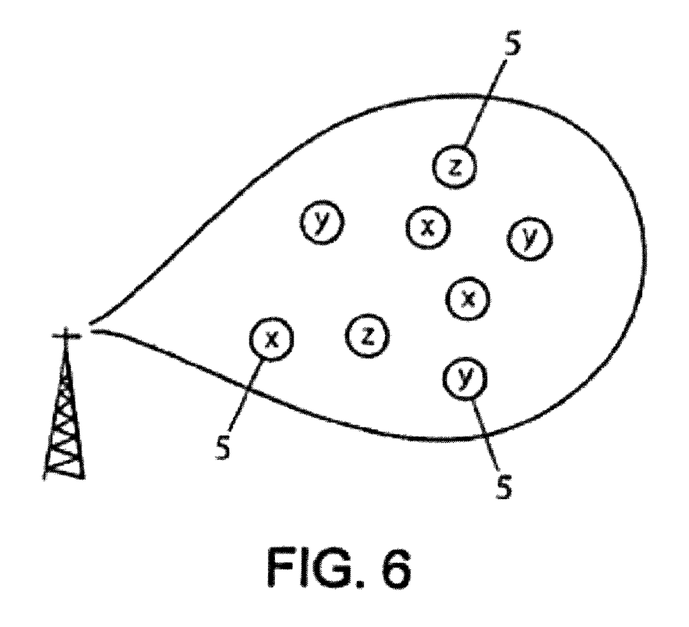
FIG. 6 is a schematic illustration of an umbrella cell and HGWs within the umbrella cell in accordance with an embodiment of the invention.

One embodiment of the invention is described in FIG. 6. From FIG. 6 it can be seen that in the coverage area of the macro cell, all the HGWs 5 do not any longer belong to the same LA. In this example, there are three different LAs (x, y and z) inside the macro cell coverage area. In this embodiment the HGWs 5 associated by the same LA (either x, y or z) are also geographically dispersed, although they could also be close to each other. From FIG. 6, it can also be seen that HGWs 5 belonging to a certain LA do no longer define a geographically continuous area containing only HGWs 5 associated by the same LAC. In this case, the LAC associated to the umbrella cell may or may not be other than any of the following LACs: x, y or z.

The lower layer (HGWs 5) and upper layer (macro) cells can be managed by the same radio network controller, such as RNC 2. But the HGWs 5 may equally be managed by the H-RNCs 22 and the macro cells may be managed by RNCs 2 so that there are separate radio network controllers for each cell layer. It has to be noted that the invention is not restricted to usage of H-RNCs 22 but the invention can be equally applied to conventional radio network controllers.

Based on the foregoing, the invention can be particularly well applied to HGW radio communication systems, since the dimensioning of a H-RNC 22 will generally be different from that of a conventional RNC 2. A conventional RNC 2 is typically designed to manage from 1,000 to 2,000 BTSs 3 or cells each having a relatively high traffic capacity (e.g. about 4 Erlang). In contrast, a H-RNC 22 may have to manage up to 50,000 or 100,000 HGWs 5 of lower traffic capacity (e.g. about 0.1 Erlang).

Paging Procedure

The above restructuring of LAs was done to simplify the mobility management and to reduce engineering and operational costs of a communication network. As was explained above, if great numbers of BTSs 3 or HGWs 5 are associated by the same LAC and are controlled by a single RNC 2 or H-RNC 22, then it is likely that the paging procedure fails, because of the great amount of signalling in the network. A new solution is proposed here to solve the paging problem. This solution can be used in connection with the LA management mechanism described above or independently of it.

According to an embodiment of the invention, the n (n>1) last HGW 5 identities associated to an MS 50 or subscriber are recorded. These identities are stored on a table in a register. The register could be physically located at the radio network controller, such as an H-RNC 22. In addition to last n HGW identities, also a timestamp can be saved so that the age of each recording can be known. The data can be mapped to the table by using, for instance international mobile subscriber identity (IMSI) of relevant subscribers so that the n latest HGWs with timestamps are linked to corresponding subscriber identities, such as IMSIs. The number n can, for instance be 5. Instead of using subscriber identities, terminal identities could be used as well. The identities may or may not be global.

Figure 7:
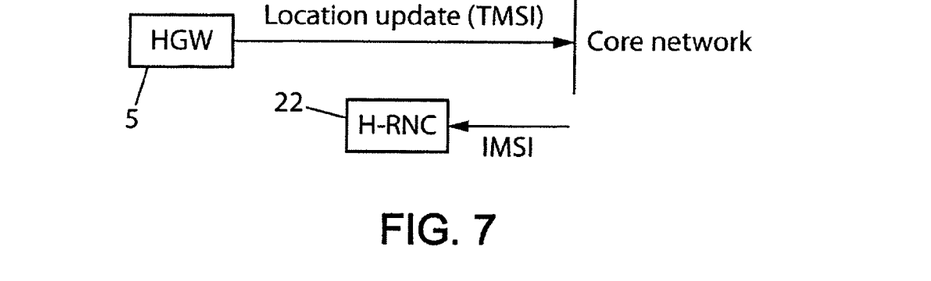
FIG. 7 illustrates a location update procedure.

FIG. 7 illustrates a method of saving the subscriber identity, such as IMSI at the H-RNC 22. When the MS 50 initiates, for instance a location update, the corresponding HGW 5 sends a temporary subscriber identity, such as temporary mobile subscriber identity (TMSI) to the core network. In the core network, the IMSI can be saved, for instance in the visitor location register. Then the core network sends the corresponding IMSI to the relevant H-RNC 22. It has to be noted that the MS 50 can also send the subscriber identity to the H-RNC 22 independently of the location update procedure.

The transmission of IMSI can be based on the COMMON ID 3GPP RANAP (radio access network application part) message (3GPP TS 25.413). The purpose of the Common ID procedure is to inform the RNC about the permanent Non Access Stratum (NAS) user equipment (UE) Identity (for instance IMSI) of a user. This is used by the RNC, for instance to create a reference between the permanent IMSI of the user and the radio resource control (RRC) connection of that user for UTRAN paging co-ordination. After having established an Iu signalling connection (between RNC and CN), and if the IMSI is available, the CN shall send to the RNC a COMMON ID message containing the IMSI. The RNC shall associate the permanent identity to the RRC connection of that user and shall save it for the duration of the RRC connection. The RANAP Common ID message can be sent at any time after the IMSI of the subscriber becomes known to the CN.

Figure 8:
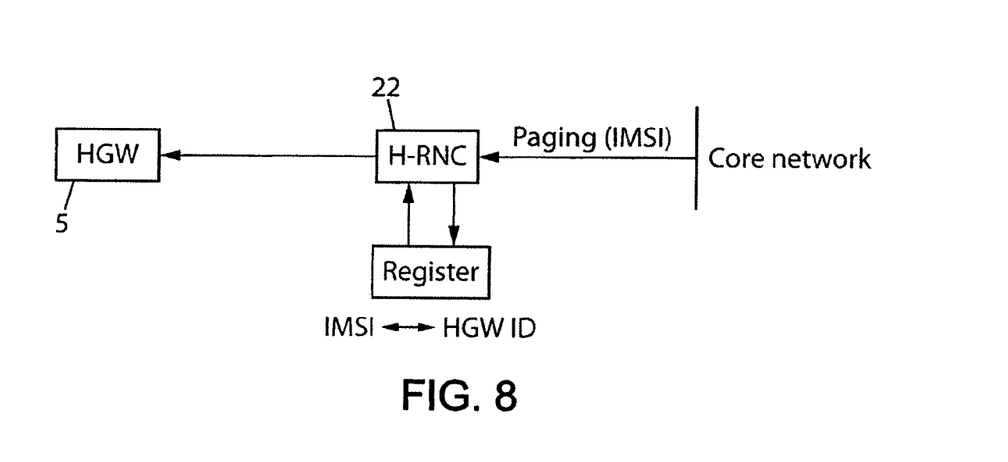
FIG. 8 illustrates a paging procedure according to an embodiment of the invention.

The subscribers of MSs 50 have to keep the H-RNC 22 updated about their movements, so that the H-RNC 22 knows the cell IDs of the cells where the subscribers are located. When a paging message, including subscriber identifier such as an IMSI, arrives in the H-RNC 22 serving the HGW 5 to be connected, the H-RNC 22 checks the register for the current location of the subscriber and the H-RNC 22 sends the paging message only to the correct HGW 5 which the terminal is currently communicating with (i.e. the cell in which the subscriber is currently located). This means that the paging message is not broadcast by all HGWs 5 that are associated by the same LAC. This is illustrated in FIG. 8. The paging message can be sent to the MS 50 by, for instance on a specific paging channel (PCH), which is a downlink (BTS to MS) transport channel that carries data relevant to the paging procedure.

The invention has been described above in the particular case of a UMTS network for the sake of illustration. It will be appreciated that it is applicable to various kinds of cellular network. It is also possible to provide the disclosed mobility management method only for certain services offered to the subscribers, for example only for the packet-switched (PS) domain, and not for the circuit-switched (CS) domain services.

The invention claimed is:

1. A mobility management method in a cellular wireless communication system comprising a core network and an access network comprising at least one controller, the method comprising:
controlling, by the at least one controller, a group of base stations each defining at least one cell; and
forming a predetermined number of location areas individually associated with cells defined by at least one of the base stations controlled by the at least one controller of the access network; and
determining an association of each given cell of the cells defined by at least one of the base stations to one of the predetermined number of location areas, wherein determining the association is independent of a geographical location of the given cell relative to locations of cells forming location areas.

2. The method according to claim 1:
wherein said defined cells are identified by respective cell identities, said at least one controller is identified by a respective controller identity and said predetermined number of location areas are associated with respective location area codes; and
wherein determining the association of each given cell to one of the predetermined number of location areas comprises forming said location area code associated with said one of the predetermined number of respective location areas by:
using as least significant bits, the m least significant bits of said given cell, and
using as most significant bits, the controller identity of said controller, where m is such that $2^m$ equals the predetermined number.

3. The method according to claim 1, wherein said association of each of said defined cells to one of the predetermined number of location areas is substantially random.

4. The method according to claim 1, wherein the predetermined number equals 32.

5. The method according to claim 1, wherein said at least some of the base stations are located indoors and define cells with an indoor coverage, wherein said indoor coverage is between 5 and 20 meters.

6. The method according to claim 1, wherein said defined cells forming the predetermined number of location areas have an umbrella cell.

7. The method according to claim 1, wherein said defined cells are identified by respective cell identities and subscribers are capable of communicating with said system by use of mobile terminals and the system further comprises a register in which the identities of the latest cells in which said subscribers were located are saved in association with identities of said subscribers.

8. The method according to claim 7, further comprising the following steps in relation to a subscriber to be paged:

obtaining an identity of said subscriber;
retrieving the cell identity associated with the identity of said subscriber in a register; and
sending a paging message only to the cell identified by the retrieved cell identity.

9. The method according to claim 8, wherein said obtaining comprises receiving said identity of said subscriber in a COMMON ID message.

10. The method according to claim 7, wherein said register is located in said controller of the access network.

11. A cellular wireless communication system comprising:
a core network; and
an access network connected to the core network via a plurality of controllers, each controller being arranged for controlling a group of base stations each defining at least one cell, wherein sets of cells form respective location areas;
wherein the cells defined by at least some of the base stations controlled by a controller of the access network form a predetermined number of location areas, and
wherein an association of each given cell of the cells defined by at least some of the base stations to one of the predetermined number of location areas is independent of a geographical location of the given cell relative to locations of cells forming the respective location areas.

12. The system according to claim 11, wherein said defined cells are identified by respective cell identities, said at least one controller is identified by a respective controller identity and said predetermined number of location areas are associated with respective location area codes, and wherein the association of each given cell to one of the predetermined number of location areas is determined by forming one of said respective location area code associated with said one of the predetermined number of location areas by using as least significant bits, the m least significant bits of said given cell, and by using as most significant bits, the respective controller identity of said at least one controller, where m is such that $2^m$ equals the predetermined number.

13. The system according to claim 11, wherein said defined cells are identified by respective cell identities and subscribers are capable of communicating with said system by use of mobile terminals and the system further comprises a register in which the identities of the latest cells in which said subscribers were located are saved in association with identities of said subscribers.

14. The system according to claim 11, wherein said at least some of the base stations are located indoors and define cells with an indoor coverage, wherein said indoor coverage is between 5 and 20 meters.

15. A base station in a cellular wireless communication system, the system comprising a core network and an access network comprising at least one controller, each controller being arranged for controlling a group of base stations each defining at least one cell, wherein sets of cells form respective location areas,
the base station being arranged for defining at least one cell which forms at least part of a location area among a predetermined number of location areas, wherein an association of each given cell to one of the predetermined number of location areas is independent of a geographical location of the given cell relative to cells forming the respective location areas.

16. The base station according to claim 15, wherein said base station is a home gateway.

17. The base station according to claim 15, wherein said defined cells are identified by respective cell identities, said at least one controller is identified by a respective controller identity and said predetermined number of location areas are associated with respective location area codes, and wherein the association of each given cell to one of the predetermined number of location areas is determined by forming one of said respective location area codes associated with said one of the predetermined number of location areas by using as least significant bits, the m least significant bits of said given cell, and by using as most significant bits, the respective controller identity of said at least one controller, where m is such that $2^m$ equals the predetermined number.

18. The base station according to claim 15, wherein said defined cells are identified by respective cell identities and subscribers are capable of communicating with said system by use of mobile terminals and the system further comprises a register in which the identities of the latest cells in which said subscribers were located are saved in association with identities of said subscribers.

19. The base station according to claim 15, wherein said at least some of the base stations are located indoors and define cells with an indoor coverage, wherein said indoor coverage is between 5 and 20 meters.

20. A controller for controlling the base station in accordance with claim 15.

* * * * *